United States Patent [19]
Crawford et al.

[11] Patent Number: 5,484,533
[45] Date of Patent: Jan. 16, 1996

[54] METHOD FOR THE STABILIZATION AND DETOXIFICATION OF WASTE MATERIAL

[75] Inventors: Paul Crawford, Bryan; James Gafford, Ingleside, both of Tex.

[73] Assignee: A.C.T. Partnership, Ltd.

[21] Appl. No.: 177,127

[22] Filed: Jan. 4, 1994

[51] Int. Cl.$^6$ ............................................. C02F 1/28
[52] U.S. Cl. ..................... 210/660; 210/667; 210/688; 210/691; 210/751
[58] Field of Search .......................... 210/662, 679, 210/751, 660, 688, 691, 667; 588/252

[56] References Cited

U.S. PATENT DOCUMENTS 5,234,498  8/1993  Graves .................................. 588/252
5,242,503  9/1993  Grant et al. ............................ 134/25.1

Primary Examiner—Ivars Cintins
Attorney, Agent, or Firm—DeWitt Ross & Stevens

[57] ABSTRACT

A process for the treatment of waste material. The process includes the steps of combining the waste material with a treatment composition to form crystal growth structures and adsorb the waste material within the crystal growth structures thereby stabilizing the waste-material. The treatment composition includes natural zeolite seed, crystalline quartz, aluminum trihydrate, sodium carbonate or sodium hydroxide, dolomitic calcium oxide or calcium oxide or dolomitic limestone, and potassium hydroxide or potassium carbonate. The zeolite seed may be selected from the group consisting of clinoptilolite, chabazite, heulandite, phillipsite or mordenite and mixtures thereof.

19 Claims, 1 Drawing Sheet

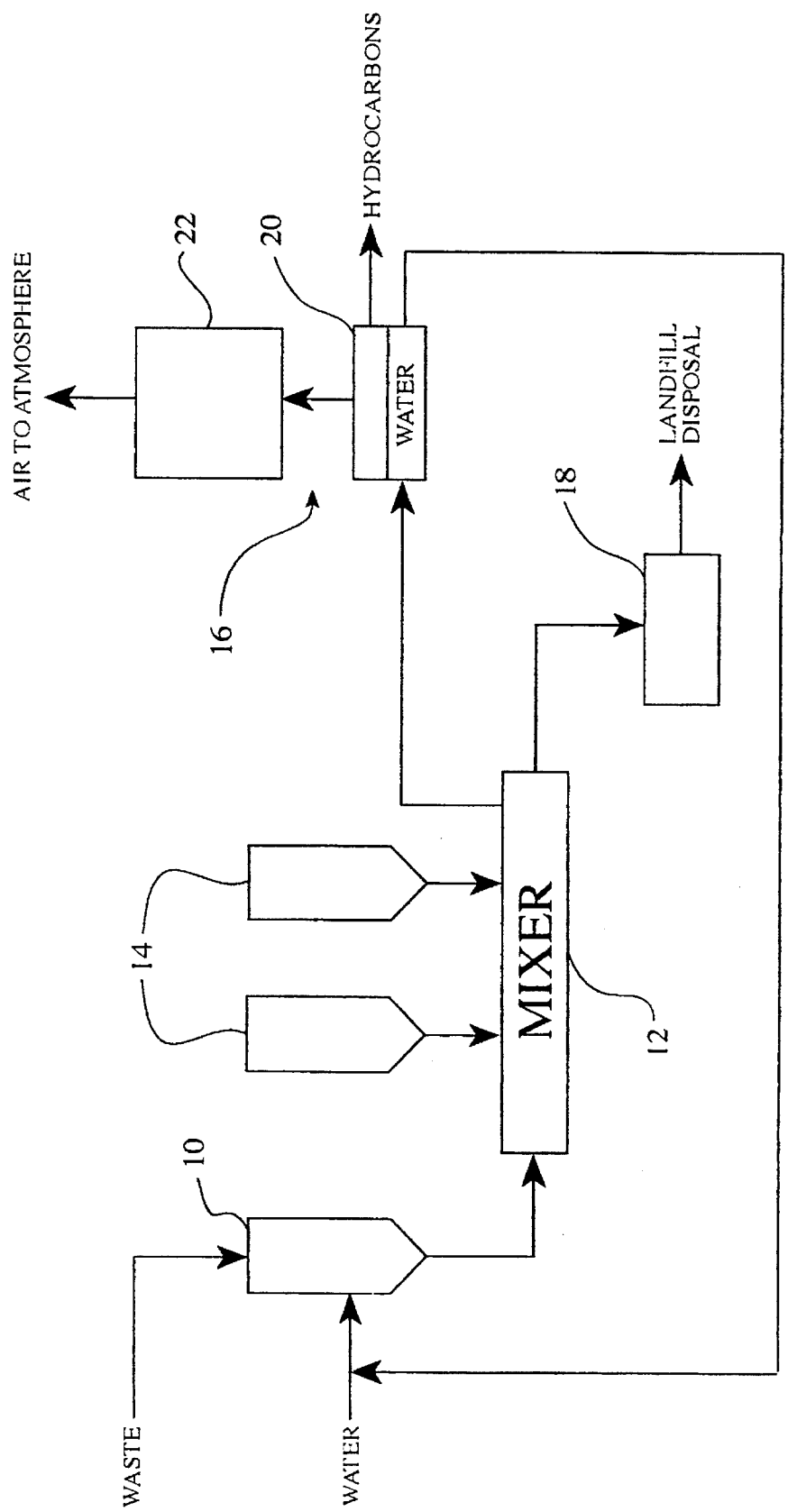

METHOD FOR THE STABILIZATION AND DETOXIFICATION OF WASTE MATERIAL

FIELD OF THE INVENTION

The present invention relates to a method for the stabilization and detoxification of waste material for subsequent disposal or "delisting" according to the United States Environmental Protection Agency (EPA) procedures and criteria. More particularly, the present invention relates to a method for the stabilization and detoxification of waste material by treating the waste material with a treatment composition thereby rendering the waste material stable and compliant with EPA regulations for subsequent disposal or "delisting" according to the U.S. EPA procedures and criteria.

BACKGROUND OF THE INVENTION

The present invention relates to a novel method for the stabilization and detoxification of waste material for subsequent disposal. Due to the recent EPA's land ban restrictions of hazardous waste material, 40 C.F.R. §§268.1–§ 268.50 (1991), an economical alternative to the available treatment technologies is being pursued by industry and other hazardous waste material generators. The Resource Conservation and Recovery Act (RCRA) has banned the land disposal of "listed" hazardous waste materials unless the waste materials can meet or exceed the Best Demonstrated Available Technology (BDAT) treatment standards identified in 40 C.F.R. §268.40 (1991).

It will be appreciated from the foregoing that there is a significant need for waste material treatment methods that render the waste material stable and non-toxic for subsequent disposal without harm to human health or the environment.

The present invention, intended to address the problems of waste material disposal, may be utilized to stabilize and detoxify waste material such as the EPA's "listed" hazardous wastes as defined in 40 C.F.R. §261.30 (1991) and EPA's characteristic hazardous wastes as defined in 40 C.F.R. §261.20 (1991), radioactive wastes, contaminated soils, and industrial and organic wastes and the like.

SUMMARY OF THE INVENTION

Briefly, according to this invention, there is provided a process for the treatment of waste material. The process includes the steps of mixing a slurry containing the waste material with a treatment composition containing natural zeolite seed; crystalline quartz; aluminum trihydrate; sodium carbonate or sodium hydroxide or potassium hydroxide or potassium carbonate, and dolomitic calcium oxide or calcium oxide or dolomitic limestone and dolomitic quicklime to form natural zeolite crystals and synthetic zeolite crystals. The zeolite crystals adsorb the waste material of the slurry within the natural zeolite crystals and synthetic zeolite crystals thereby producing stabilized waste material. The dolomitic quicklime may be added to the slurry separate from the treatment mixture.

The process of the present invention includes the steps of determining the amount of unbound water in the waste material; and hydrating the waste material to form the slurry. When the waste material includes aggregate or debris the aggregate or debris is segregated from the waste material by soaking the aggregate or debris in a water bath to remove remaining waste material from the aggregate or debris. To ensure the aggrgate or debris is stabilized the segregated aggrgate or debris tested. The water from the bath containing the waste material is then cycled with the waste material.

The natural zeolite seed in accordance with the present invention is selected from the group consisting of clinoptilolite, chabazite, heulandite, phillipsite or mordenite and mixtures thereof.

The apparatus for the treatment of the waste material in accordance with the present invention includes a means for hydrating the waste material to form a slurry containing a selected proportion of water; a mixer for mixing the slurry with a treatment composition including natural zeolite seed; crystalline quartz; aluminum trihydrate; sodium carbonate or sodium hydroxide or potassium hydroxide or potassium carbonate, and dolomitic calcium oxide or calcium oxide or dolomitic limestone and dolomitic quicklime to form natural zeolite crystals and synthetic zeolite crystals to adsorb the waste material of the slurry thereby producing stabilized waste material including solids and vapors; and a vapor recovery system including a condenser for condensing water and hydrocarbons from the vapors and a carbon filter for treating the vapors, wherein the water is recycled for hydrating the waste material.

BRIEF DESCRIPTION OF THE DRAWING

Further features and other objects and advantages of this invention will become clear from the following detailed description made with reference to the drawing in which FIG. 1 is a schematic depiction of the process in accordance with the present invention.

DETAILED DESCRIPTION OF THE PREFERRED EMBODIMENTS

In considering FIG. 1 it must be understood that the drawing is schematic only and that details of construction are not provided for purposes of clarity. It will also be understood that these construction details are, once the invention is disclosed and explained, well within the skill of the art. For example, the various apparatus and processes for handling the waste material and the treatment composition, separate from the inventive process itself, are those known generally in the chemical process industries. Reference is made to Perry and Chilton, CHEMICAL ENGINEERS' HANDBOOK, 5th Edition, McGraw Hill, New York, 1973, and to the chemical processing industry literature generally for detailed descriptions on the various apparatus and processing structures and conditions.

Now referring to FIG. 1, the process of treating waste material with the treatment composition 14 to stabilize and detoxify the waste material in accordance with the present invention is illustrated. Generally, the process involves the steps of hydrating the waste material to form a slurry, mixing the hydrated waste material with a treatment composition 14 to form a mixture, adding dolomitic quicklime to the mixture and then mixing these components together to promote the formation and growth of crystalline structures. The dolomitic quicklime may be added as part of the treatment composition 14 or separately from the treatment composition. The growth of the crystalline structures occurs between 200–250 degrees fahrenheit. Accordingly, it will be appreciated that to promote accelerated crystalline growth, heat may be applied to a mixer 12 containing the mixture by a steam jacket or other suitable means. The treated waste material, rendered stable and nontoxic, may then be subsequently disposed of as required.

Although the process of the present invention may be conducted open to the atmosphere it will be appreciated that in order to comply with current EPA regulatory requirements the process of the present invention must be closed from the atmosphere or a conventional vapor recovery system must be employed to prevent toxic air emissions.

As used herein the term "waste material" refers to most any undesirable offal such as but not limited to those wastes listed and identified by the EPA including but not limited to various "listed" hazardous wastes and characteristically hazardous wastes as defined above, radioactive soils, contaminated soils, and industrial and organic wastes. Furthermore, the term "stabilized" refers to the condition of the waste material after treatment wherein the toxic constituents as identified by the EPA or a state agency are measured to be below regulatory levels for total constituent concentrations and leachable constituent concentrations using laboratory methods as approved by the EPA and published in "Test Methods For Evaluating Solid Waste" Document No. SW-846.

The waste material to be treated may contain large aggregate or debris, for example, contaminated soil. The waste material that contains aggregate and/or debris is preferably segregated before treatment by using screens, shakers or other suitable waste segregating devices. The segregated aggregate and debris is then placed in a water bath to soak thereby removing the remaining waste material molecules from the aggregate and/or debris. After soaking and removal of the remaining waste material molecules from the aggregate and/or debris, the segregated aggregate and debris may be tested according to EPA criteria before appropriate disposal. The contaminated water from the bath containing the waste material may then be cycled into the process of the present invention as described herein.

After the waste material is isolated, the waste material is conveyed to a waste slurry tank 10 of conventional design. The waste material is evaluated before being slurried by hydration with water to determine the amount of unbound, available water. A percent moisture test is performed using test method ASTM D-2216 to evaluate the amount of unbound, available water present in the waste material. It will be appreciated that the amount of available water in individual waste material streams will vary. The proper proportion of water must be available in the process in order to hydrate the crystals as they are formed. If the waste material contains an excessive water content, the waste material may be dewatered before treatment by using devices such as a centrifuge, plate and frame filter press or a thermal dryer. The dewatering process significantly reduces the waste material volume and weight before treatment. If sufficient water is not available in the waste material, additional water must be added in the waste slurry tank 10. The amount of water needed to hydrate the crystals is determined by the constituent molar ratios as shown below in Tables 4 and 5. If the percent moisture test indicates that the waste material is deficient in the amount of water required to hydrate the crystals, the appropriate amount of water is added in the waste slurry tank 10 to assure that the needed water is available for the process of the present invention.

The waste material slurry is then charged to a mixer 12 for blending with a treatment composition 14. It will be appreciated that complete intermixing of the waste material slurry and the treatment composition 14 is important to the successful practice of the present invention. Intensive mixing should be maintained for approximately 15–45 minutes and preferably 30 minutes. The mixer 12 may be a ribbon blender, auger system, pug mill, a tank or the like. As previously discussed, the mixer 12 should be enclosed to prevent the discharge of untreated vapor. The mixer 12 should be constructed of or lined with inert materials which will not leach or absorb the waste materials. For example, 916 stainless steel or pyrex glass may be used when processing the waste material slurry.

In a preferred embodiment, the mixer 12 may be insulated to retain the heat generated in the mixer and/or the mixer may be steam jacketed to supplement the heat generated within the mixer to promote and accelerate synthetic zeolite crystal formation and growth as explained herein. The waste material slurry and treatment composition 14 are intimately mixed in the mixer 12 and heated to between approximately 140–250 degrees fahrenheit and preferably approximately 220 degrees fahrenheit to promote and accelerate synthetic zeolite crystal formation and growth. The temperature required to produce the synthesized zeolite crystal is approximately 150–300 degrees fahrenheit. After discharge from the mixer 12, crystalline growth will continue at a slower rate without heat.

A suitable treatment composition 14 for the waste material slurry is provided in Table 1.

TABLE 1

| Treatment composition | Range- % by weight | Preferred Range-% by weight |
|---|---|---|
| Natural zeolite seed: clinoptilolite, chabazite, heulandite, phillipsite or mordenite | 2–50 | 14 |
| crystalline quartz | 10–80 | 41 |
| sodium carbonate or sodium hydroxide | 10–50 | 31 |
| aluminum trihydrate | 2–50 | 10 |
| dolomitic calcium oxide or calcium oxide or dolomitic limestone | 2–50 | 4 |
| Total | | 100% |

In yet another embodiment of the present invention, the treatment composition 14 may be as set forth in Table 2. As shown in Table 2, potassium hydroxide or potassium carbonate is substituted for the sodium hydroxide or sodium carbonate of the treatment composition of Table 1.

TABLE 2

| Treatment composition | Range- % by weight | Preferred Range-% by weight |
|---|---|---|
| Natural zeolite seed: clinoptilolite, chabazite, heulandite, phillipsite or mordenite | 2–50 | 14 |
| crystalline quartz | 10–80 | 41 |
| dolomitic calcium oxide or calcium oxide or dolomitic limestone | 2–50 | 4 |
| aluminum trihydrate | 2–50 | 10 |
| potassium hydroxide or potassium carbonate | 10–50 | 15 |
| Total | | 100% |

The following Tables 3 and 4 indicate the molar relationship of sodium or potassium, respectively, added with the other reactants to synthesize the zeolite crystals in accordance with the present invention. Depending upon the variation of the reactant composition, other zeolite crystals may be formed and co-exist with the clinoptilolite such as mordenite, phillipsite and gismondine.

TABLE 3

| Reactant | Seeds (% by weight) | Moles |
|---|---|---|
| $SiO_2$ | — | 5 |
| $Al(OH_3)$ | — | 1 |
| $Na(OH)$ | — | 2.1 |
| Water | — | 52.5 |
| Zeolite | 10 | — |

TABLE 4

| Reactant | Seeds (% by weight) | Moles |
|---|---|---|
| $SiO_2$ | — | 5 |
| $Al(OH_3)$ | — | 1 |
| $K(OH)$ | — | 2.1 |
| Water | — | 52.2 |
| Zeolite | 10 | — |

It is believed that waste material molecules are retained within cavities formed within the framework of the zeolite crystals by attractive forces of electrostatic and van der Waals types. Notwithstanding, it will be appreciated that the adsorbent capacity of natural zeolite crystals is limited by the angstrom size of the pore openings within the framework of the natural zeolite crystals. For example, the natural zeolite crystals of the treatment composition 14 adsorb and retain waste material molecules of a size ranging from 2–6 angstroms. Organic waste molecules greater than approximately 6 angstroms are too large to fit in the pore spaces of the natural zeolite. Accordingly, the natural zeolite is also intended to function as a seed to form synthetic zeolite crystals. The formation of synthetic zeolite crystals within the mixer 12 facilitates the adsorption of waste material molecules of a size ranging from approximately 6–14 angstroms. Consequently, by creating a synthetic zeolite from the natural zeolite seed we have found it possible to capture, stabilize and detoxify a wide range of waste material molecule sizes in a single process.

It is preferred that the minerals in the treatment composition 14 be ground in the range of approximately 5–150 microns in size. The natural zeolite of the treatment composition 14 is finely ground to expose more end members of the zeolite crystal latice and increase the number of active sites to initiate and speed the growth of synthetic zeolite crystals. The natural zeolite is added to seed the growth of the synthetic zeolite crystals. Suitable natural zeolites may be obtained from Zeotech Group, Applied Industrial Materials Group or Double Eagle, Idaho and include clioptilolite, haulandite, phillipsite, mordenite, gismondine and chabazite.

The treatment composition 14 also includes crystalline quartz. The crystalline quartz is added to the mixer 12 to seed the growth of the synthetic zeolite crystals. Suitable crystalline quartz sold under the tradename Minusil or Glass Sand or T135 and may be obtained from U.S. Silica.

Sodium carbonate or sodium hydroxide or potassium hydroxide or potassium carbonate is also added to the mixer 12. The sodium carbonate or sodium hydroxide may be obtained from Rhone-Poulenc Basic Chemicals Co. The potassium hydroxide or potassium carbonate may be obtained from Oxidental Chemicals, Inc.

Aluminum trihydrate is added to the treatment mixture to satisfy the crystal structure requirements for synthesis. The aluminum trihydrate may be obtained from ALCOA Industrial Chemical Division.

Dolomitic calcium oxide sold under the tradename Cal-Dol by APG Lime Co. or calcium oxide and dolomitic limestone sold under the tradename Dolocron and distributed by Hamill & Gillestie of New Jersey, is then added to the mixer 12.

The Cal-Dol or dolomitic limestone is primarily added for three reasons; 1) to raise the alkalinity or pH of the mixture and precipitate metal contaminant molecules in the waste material, 2) disassociate in water to release calcium and magnesium, and 3) exothermically react with the remaining water in the waste mixture to generate heat to promote crystal formation and growth as previously explained. The quicklime assists in drying the final waste/mix and reduces the final waste disposal weight by vaporizing the water. Magnesium is used in the synthesis of the synthetic zeolite crystals. As the Cal-Dol or Quicklime dissolves, heat is released to promote the synthetic zeolite crystal formation.

As shown in Tables 1 and 2, the treatment composition 14 will stabilize hazardous constituents by utilizing either the hydroxide or carbonate forms of sodium and potassium. Furthermore, it is believed that via adsorption, crystalline growth and synthesis of zeolites, the waste contaminant molecules are adsorbed and stabilized by the zeolites and embedded within the crystal growth structures.

The invention will be further clarified by a consideration of the following example, which is intended to be purely exemplary of the use of the present invention.

EXAMPLE

A one quart test sample of a "listed" hazardous waste as defined by the EPA was obtained from an oil refinery for treatment in accordance with the present invention. The test sample consisted of KO48 and KO51 commonly known in the oil industry as API Separator Sludge and Dissolved Air Flotation Solids, respectively.

Briefly, the sample was contained in a one quart glass jar and preweighed prior to treatment. The sample was mixed with potable water to form a slurry. During mixing a treatment mixture in accordance with Table 1 was added to the waste slurry over approximately 3 minutes to avoid clumping of the treatment mixture. As the sample, treatment mixture and potable water were mixed, additional potable water was added to ensure that the crystals would be adequately hydrated and adequate contact between the sample and the treatment mixture obtained. For most wastes, approximately ½ quart of potable water will be adequate to process one quart of waste material.

The sample began to heat up after about 8–10 minutes of mixing and steam and vapor were formed after approximately 12–14 minutes of mixing. After approximately 20–25 minutes of mixing, adequate contact between the waste material and treatment composition had occurred for zeolite synthesis to occur. The sample was then allowed to cool for approximately 1 hour and reweighed. The sample was then chemically analyzed.

The concentrations of several constituents of concern of the waste mixture before and after treatment in accordance with the present invention are provided in Tables 5, 6 and 7.

TABLE 5

| Mixture Constituent | Feed (PPM) | After Treatment (PPM) | EPA Accepted Level (BDAT) (PPM) | % Removal |
|---|---|---|---|---|
| anthracene | 25 | 1.9 | 28.0 | 92.4 |

TABLE 5-continued

| Mixture Constituent | Feed (PPM) | After Treatment (PPM) | EPA Accepted Level (BDAT) (PPM) | % Removal |
|---|---|---|---|---|
| benzene | <1.25 | 0.49 | 14 | — |
| benzo(a)anthracene | <20 | <1.7 | 20.0 | — |
| benzo(a)pyrene | <20 | <1.7 | 12.0 | — |
| bis(2-ethylhexyl)phthalate | <20 | <1.7 | 7.3 | — |
| chrysene | 51.0 | 4.1 | 15.0 | 91.2 |
| di-n-butylphthalate | <20 | 1.7 | 3.6 | — |
| ethylbenzene | 13.0 | 0.74 | 14.0 | 43.1 |
| naphthalene | 160.0 | 4.1 | 42.0 | 97.4 |
| phenanthrene | 230.0 | 18.0 | 34.0 | 92.2 |
| phenol | <20 | <1.7 | 3.6 | — |
| pyrene | <20 | <1.7 | 36.0 | — |
| toluene | <1.25 | 0.75 | 14.0 | — |
| xylene | 429.0 | 2.46 | 22.0 | 99.4 |
| cyanide | <0.02 | <0.02 | 1.8 | — |

TABLE 6

| Constituent | TCLP Feed (PPM) | TCLP AFTER TREATMENT (PPM) | Total Feed (PPM) | TOTAL AFTER TREATMENT (PPM) |
|---|---|---|---|---|
| Barium | 0.69 | 0.76 | 595 | 129 |
| Chromium | <0.05 | 0.05 | 64 | 25 |
| Lead | 0.05 | 0.05 | 76 | 17 |
| Nickel | 2.44 | 0.05 | 262 | 51 |

TCLP refers to toxicity characteristic leachmate procedure.

TABLE 7

| Constituent | Feed (PPM) | AFTER TREATMENT (PPM) | % Removal |
|---|---|---|---|
| TPH | 49,000 | 2,300 | 95.3 |
| Flourene | 310 | 16 | 94.8 |

TPH refers to total petroleum hydrocarbons. The amount of benzene, ethylbenzene, toluene and xylene was determined by EPA test method SW846-8020 and the remaining constituents of the mixture were tested by EPA test method SW846-8270. The extraction for metals was by EPA method SW 846-1311 and tested by EPA test method SW846-6010. TPH was tested by EPA test method 418.1/3550 and flourene, chrome and lead were tested in accordance with EPA test method SW846- 6010.

As shown in Tables 5, 6 and 7, the amount of anthracene, chrysene, naphthalene, phenanthrene and xylene present in the mixture exceeded BDAT land fill requirements as determined by the EPA. After treatment in accordance with the present invention the treated hazardous waste was stabilized and detoxified sufficiently for disposal in accordance with EPA and state regulations.

It will be appreciated that the present invention will also stabilize waste material without adding dolomitic calcium oxide or calcium oxide or dolomitic limestone, but better results have been obtained using the ingredients.

Any vapors generated during the process of the present invention may be collected and condensed in a conventional vapor recovery system 16, such as a knock out drum condenser 20 and a carbon filter 22 as known in the chemical processing industry. The process vapors are formed from that part of the waste material having a boiling point less than the operating temperature within the mixer 12. For example, the vapor may contain water vapor and organic hydrocarbons and the like. The water vapor is collected and condensed and may be recycled for use in forming the slurry in the waste slurry tank 10 as previously described and the organic hydrocarbons may be recycled back to the waste generator or recycled as a product at an approved recycling facility.

The detoxified waste material solids remaining in the mixer 12 are collected in a roll-off box 18 and then disposed of at an approved landfill in accordance with governmental regulations.

After stabilization of the waste material it is advisable that the treated waste material is not overdried to a powder in view of landfill limitations of not accepting a powdery material as the powder material may blow out of containers when dumping. If the stabilized waste material is in powder form water misters may be provided as known in the art to remoisten the treated waste material for subsequent disposal.

Having described presently preferred embodiments of the invention, it is to be understood that it may be otherwise embodied within the scope of the appended claims.

What is claimed is:

1. A process for the treatment of a slurry containing waste material comprising the steps of:

(a) mixing the slurry with a treatment composition containing natural zeolite seed selected from the group consisting of clinoptilolite, chabazite, heulandite, phillipsite, mordenite, and mixtures thereof; crystalline quartz; aluminum trihydrate; sodium carbonate or sodium hydroxide or potassium hydroxide or potassium carbonate, and dolomitic calcium oxide or calcium oxide or dolomitic limestone and dolomitic quicklime to form a treatment mixture including natural zeolite crystals and synthetic zeolite crystals; and (b) adsorbing the waste material of the slurry within the natural zeolite crystals and synthetic zeolite crystals thereby producing stabilized waste material.

2. The process of claim 1 further comprising the steps of:

(a) determining the amount of unbound water in a waste material; and (b) hydrating the waste material to form the slurry.

3. The process of claim 2 further comprising the steps of:

(a) segregating aggregate or debris from the waste material;

(b) soaking said aggregate or debris in a water bath to remove remaining waste material from the aggregate or debris;

(c) testing the segregated aggregate or debris for the presence of waste material; and (d) recycling water from the water bath and hydrating the waste material with the recycled water.

4. The process of claim 2 wherein the slurry is mixed with the treatment composition for approximately 15–45 minutes.

5. The process of claim 2 wherein the slurry is mixed with the treatment composition for approximately 30 minutes.

6. The process of claim 5, wherein the slurry is mixed with the treatment composition at a temperature of from about 140–250 degrees fahrenheit.

7. The process of claim 5 wherein the slurry is mixed with the treatment composition at a temperature of about 220 degrees fahrenheit.

8. The process of claim 2 wherein the treatment composition contains natural zeolite seed 2–50 percent by weight;

crystalline quartz 10–80 percent by weight; sodium carbonate or sodium hydroxide 10"50 percent by weight; aluminum trihydrate 2–50 percent by weight and dolomitic calcium oxide or calcium oxide or dolomitic limestone 2–50 percent by weight.

9. The process of claim 2 wherein the treatment composition contains natural zeolite seed 14 percent by weight; crystalline quartz 41 percent by weight; sodium carbonate or sodium hydroxide 31 percent by weight; aluminum trihydrate 10 percent by weight and dolomitic calcium oxide or calcium oxide or dolomitic limestone 4 percent by weight.

10. The process of claim 2 wherein the treatment composition contains natural zeolite seed 2–50 percent by weight; crystalline quartz 10–80 percent by weight; dolomitic calcium oxide or calcium oxide or dolomitic limestone 2–50 percent by weight; aluminum trihydrate 2–50 percent by weight and potassium hydroxide or potassium carbonate 10–50 percent by weight.

11. The process of claim 2 wherein the treatment composition contains natural zeolite seed 14 percent by weight; crystalline quartz 41 percent by weight; dolomitic calcium oxide or calcium oxide or dolomitic limestone 4 percent by weight; aluminum trihydrate 10 percent by weight and potassium hydroxide or potassium carbonate 15 percent by weight.

12. A process for the treatment of a waste material comprising the steps of:
  (a) determining the amount of unbound water in the waste material;
  (b) hydrating the waste material to form a slurry;
  (c) mixing the slurry with a treatment composition comprising natural zeolite seed selected from the group consisting of clinoptilolite, chabazite, heulandite, phillipsite, mordenite, and mixtures thereof; crystalline quartz; aluminum trihydrate; sodium carbonate or sodium hydroxide or potassium hydroxide or potassium carbonate, and dolomitic calcium oxide or calcium oxide or dolomitic limestone and dolomitic quicklime at a temperature from about 140–250 degrees fahrenheit to form a treatment mixture including natural zeolite crystals and synthetic zeolite crystals; and
  (d) adsorbing the waste material of the slurry within the natural zeolite crystals and synthetic zeolite crystals thereby producing stabilized waste material.

13. A process for the treatment of a slurry containing waste material comprising the steps of:
  (a) mixing the slurry with a treatment composition containing natural zeolite seed selected from the group consisting of clinoptilolite, chabazite, heulandite, phillipsite, mordenite, and mixtures thereof; crystalline quartz; aluminum trihydrate; and a substance selected from the group consisting of sodium carbonate, sodium hydroxide, potassium hydroxide, and potassium carbonate to form a treatment mixture including natural zeolite crystals and synthetic zeolite crystals; and
  (b) adsorbing the waste material of the slurry within the natural zeolite crystals and synthetic zeolite crystals thereby producing stabilized waste material.

14. The process of claim 13, further comprising the steps of;
  (a) determining the amount of unbound water in a waste material; and
  (b) hydrating the waste material to form the slurry.

15. The process of claim 14, wherein the slurry is mixed with the treatment composition for approximately 15–45 minutes.

16. The process of claim 15, wherein the slurry is mixed with the treatment composition at a temperature of from about 140–250 degrees fahrenheit.

17. The process of claim 14, wherein the treatment composition contains natural zeolite seed 2–50 percent by weight; crystalline quartz 10–80 percent by weight; a substance selected from the group consisting of sodium carbonate, sodium hydroxide, potassium hydroxide, and potassium carbonate 10–50 percent by weight; and aluminum trihydrate 2–50 percent by weight.

18. A process for the treatment of a slurry containing waste material comprising the steps of:
  (a) mixing the slurry with a treatment composition containing natural zeolite seed selected from the group consisting of clinoptilolite, chabazite, heulandite, phillipsite, mordenite, and mixtures thereof; crystalline quartz; aluminum trihydrate; sodium carbonate or sodium hydroxide or potassium hydroxide or potassium carbonate, and dolomitic calcium oxide or calcium oxide or dolomitic limestone to form a treatment mixture including natural zeolite crystals and synthetic zeolite crystals; then
  (b) adding dolomitic quicklime to the treatment mixture; and
  (c) adsorbing the waste material of the slurry within the natural zeolite crystals and synthetic zeolite crystals thereby producing stabilized waste material.

19. A process for the treatment of a waste material comprising the steps of:
  (a) determining the amount of unbound water in the waste material;
  (b) hydrating the waste material to form a slurry;
  (c) mixing the slurry with a treatment composition comprising natural zeolite seed selected from the group consisting of clinoptilolite, chabazite, heulandite, phillipsite, mordenite, and mixtures thereof; crystalline quartz; aluminum trihydrate; sodium carbonate or sodium hydroxide or potassium hydroxide or potassium carbonate, and dolomitic calcium oxide or calcium oxide or dolomitic limestone at a temperature from about 140–250 degrees fahrenheit to form a treatment mixture including natural zeolite crystals and synthetic zeolite crystals;
  (d) adding dolomitic quicklime to the treatment mixture; and
  (e) adsorbing the waste material of the slurry within the natural zeolite crystals and synthetic zeolite crystals thereby producing stabilized waste material.

* * * * *